United States Patent [19]

Lehman et al.

[11] Patent Number: 5,277,060
[45] Date of Patent: Jan. 11, 1994

[54] WHEEL CENTERING DEVICE

[75] Inventors: James R. Lehman, Potterville; Walter S. Smith, Rockford, both of Mich.

[73] Assignee: Burke E. Porter Machinery Company, Grand Rapids, Mich.

[21] Appl. No.: 845,651

[22] Filed: Mar. 4, 1992

[51] Int. Cl.[5] ............................................. G01M 17/00
[52] U.S. Cl. ....................................................... 73/117
[58] Field of Search ........................... 73/117, 123.127

[56] References Cited

U.S. PATENT DOCUMENTS

| | | |
|---|---|---|
| 2,251,803 | 8/1941 | Pummill .............................. 73/146 |
| 2,583,201 | 1/1952 | Bennett . |
| 2,709,362 | 5/1955 | Marcus et al. . |
| 2,803,132 | 8/1957 | Clayton . |
| 2,849,675 | 8/1958 | Hall et al. ............................. 73/146 |
| 3,443,427 | 5/1969 | Cline . |
| 3,680,368 | 8/1972 | Warsaw . |
| 3,803,909 | 6/1974 | Ostrander . |

OTHER PUBLICATIONS

Burke E. Porter Machinery Company brochure, "Roll/Brake Test Machines Model 360".

Primary Examiner—Robert Raevis
Attorney, Agent, or Firm—Varnum, Riddering, Schmidt & Howlett

[57] ABSTRACT

A wheel centering device for use in a motor vehicle test platform employs mechanically synchronized centering rolls to position the driven wheel of a vehicle to be tested at the top center of the dynamometer roll. The centering rolls may be pivotally supported on a pair of lift brackets which are provided with toothed gear sections at their pivot ends for mechanical synchronization. Alternatively, the centering rolls may be supported on carriages disposed on opposite sides of the vertical centerline and movable on carriage tracks extending in upwardly sloping inclined planes disposed on opposite sides of the vertical centerline of the dynamometer roll. Movement of the carriages may be synchronized by means of a drive shaft consisting of two oppositely threaded ball screw sections and ball nuts, each attached to one of the carriages. Rotation of the shaft in one direction causes the carriages and the centering rolls to approach the vehicle wheel while maintaining an equal distance between each of the centering rolls and the vertical centerline of the dynamometer. Furthermore, movement of the carriages may be synchronized by means of an interconnected chain and sprocket system in which a driven chain is connected to one of the carriages and engages a two-chain sprocket and another chain is connected to the other carriage and the same two-chain sprocket.

18 Claims, 8 Drawing Sheets

WHEEL CENTERING DEVICE

BACKGROUND OF THE INVENTION

1. Field of the Invention

The invention relates to a wheel centering device and more particularly to such a device in a motor vehicle test system.

2. Prior Art

Motor vehicle test systems have long been used to test performance of various vehicle subsystems in a controlled environment simulating actual road conditions. One known motor vehicle test system comprises a test platform for supporting the drive wheels of a vehicle under test in contact with what is known as a dynamometer roll. The dynamometer roll may be used to sense the power output of the drive wheels or to apply a variable load condition to the wheels to simulate a variety of driving conditions. Engine emission testing is commonly performed on such a test platform. The tests are made under a number of different conditions, such as cold engine, hot engine, light load, heavy load, etc. In order to obtain accurate measurements in the same tests performed on a number of different vehicles or on the same vehicle under different operating conditions, it is essential that the test platform conditions do not change from test to test. It has been found, for example, that test results are influenced by a change in the position of the wheels of the vehicle relative to the dynamometer roll.

A number of different arrangements for positioning the wheel of the vehicle on a dynamometer roll are known from the prior art. Some prior art systems employ a dynamometer roll and an idler roll spaced apart from the dynamometer roll, with the wheel of the vehicle supported on both rolls. In another arrangement, a pair of idler rollers are used, in front and behind the wheel, to position the wheel such that a top portion of the dynamometer roll makes contact with a bottom portion of the wheel. A problem of these and other prior art arrangements is a lack of control over the precise positioning of the vehicle wheel with respect to the dynamometer roll. Since even a slight variation in the relative position of the dynamometer roll and the wheel can significantly affect test results, a device for accurately controlling the positioning of the wheel is needed.

SUMMARY OF THE INVENTION

These and other problems of the prior art are solved in accordance with this invention by means of a pair of mechanically synchronized centering rolls which are moved into contact with the wheel of the vehicle to be tested along paths of travel in which corresponding points are equidistant from the vertical centerline of the dynamometer roll. Advantageously, this assures that the wheel of the vehicle to be tested will always be positioned in contact with the top center portion of the dynamometer roll.

In one embodiment of the invention, the wheel positioning mechanism includes a pair of lift brackets, each supporting one of the centering rolls at one end and each pivotally mounted at another end. An arcuate toothed gear section having a plurality of gear teeth is provided on the other end of each of the lift brackets in meshing engagement with gear teeth of the other bracket to mechanically synchronize the movement of the two brackets. The two lift brackets are pivoted at pivot points which are equidistant from the vertical centerline of the dynamometer roll and an equal distance is maintained between the dynamometer roll centerline and the centering rolls as the lift brackets are rotated about the pivot points. In a specific embodiment of the invention, the lift brackets are rotated about their pivot points by means of an actuating device actuating a pivot link and a torque bracket interconnecting the pivot link and one of the lift brackets.

Advantageously, the above-defined arrangement may be used to lift the vehicle wheel to a position wherein it is not in contact with the dynamometer roll. This position is advantageously used during dynamometer warmup. Furthermore, the linking arrangement of the invention allows the lift brackets to be placed in a past-center alignment position wherein the lift link and torque bracket are mechanically locked, maintaining the vehicle wheel in a position removed from the dynamometer roll without the need to maintain power to the actuating device. Two separate actuating devices, torque brackets, and lift links may be used, one for each lift bracket, and the mechanical locked position may be readily disengaged by selective operation of the individual actuating devices. Advantageously, the invention allows precise positioning of a vehicle wheel with respect to a dynamometer roll using a relatively small number of individual parts which are readily accessible, thereby increasing the reliability and maintainability of the system.

In another embodiment of the invention, the two centering rolls are supported on carriages which are movably supported on carriage tracks disposed on opposite sides of the vertical centerline of the dynamometer roll. The carriages are mechanically synchronized such that an equal distance is maintained between the vertical centerline of the dynamometer roll and each of the carriages. In one particular embodiment, the synchronizing apparatus comprises a carriage control shaft having oppositely threaded screw sections on opposite sides of that centerline and corresponding threaded nuts linked to the carriages. Rotation of the control shaft results in equal movement of the carriages with respect to the vertical centerline of the dynamometer roll. The carriage tracks are positioned in inclined planes extending upwardly toward the centerline of the dynamometer roll. The tracks may each be provided with sloping end sections adjacent the vertical centerline extending out of the inclined plane and sloping toward the centerline to provide a mechanical locking position for the carriages when these are at least partially supported on the sloping end sections. Advantageously, the locking arrangement provided by the sloping end sections allows the centering rolls to support the driving wheel of a vehicle in a locked position away from engagement with the dynamometer roll without the need to maintain driving power to the centering device.

In yet another embodiment of the invention, the carriages, supported on carriage tracks, are synchronized by means of a pair of mechanically interconnected chains. One of the chains is connected to one of the carriages, a drive sprocket, and a two-chain sprocket while the other chain is connected to the other of the carriages and the two-chain sprocket to assure synchronous operation of the two carriages.

BRIEF DESCRIPTION OF THE DRAWING

An illustrative embodiment of the invention is described below with reference to the drawing in which.

DETAILED DESCRIPTION

Figure 1:
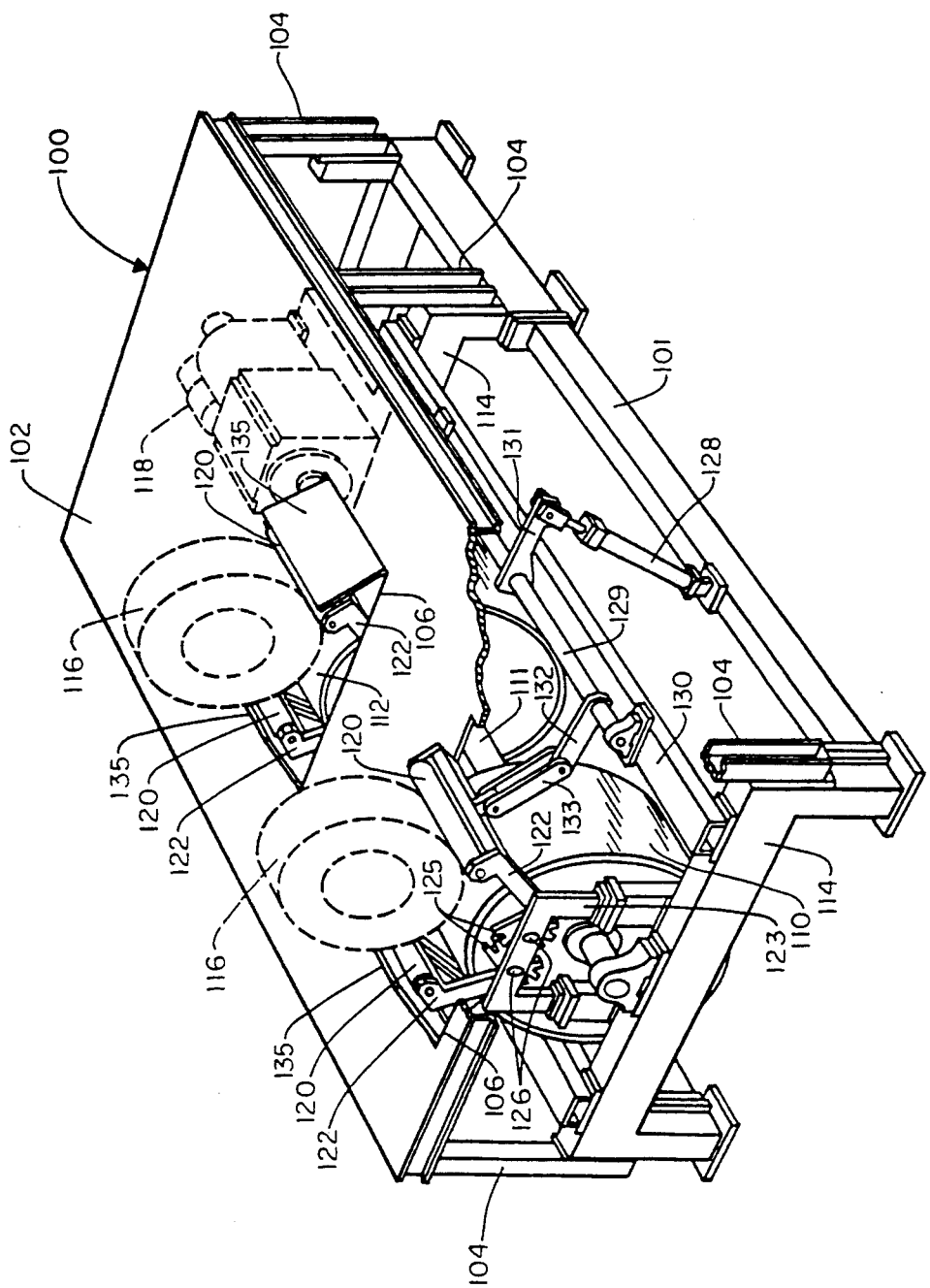
FIG. 1 is a perspective partially cutaway view of a motor vehicle test platform embodying apparatus of the invention.

FIG. 1 illustrates an embodiment of the invention in a motor vehicle test platform 100, shown in perspective view. The test platform 100 includes a support structure 101 and a top surface or deck 102. A portion of the top surface 102 is shown cutaway to better illustrate the principles of the invention. The top surface 102 is supported on a plurality of vertically extending support members 104. A pair of aligned dynamometer rolls 110, 112 are spaced apart on a common shaft 111 supported on horizontally extending support members 114. The top surface or deck 102 is provided with openings 106 and a portion of the dynamometer rolls 110, 112 extends through the openings 106 for contacts with test vehicle driving wheels, illustrated at 116. The shaft 111, on which the dynamometer rolls 110, 112 are carried, is operated by a standard dynamometer drive unit shown in phantom in FIG. 1 at 118. The drive unit 118 may be controlled in a standard fashion by a well-known dynamometer control system. Adjacent each of the dynamometer rolls 110, 112 there are provided two centering rolls 120 which are moved toward the vehicle wheels from opposite directions and function to center the vehicle wheels on a top portion of the dynamometer rolls such that the vertical centerlines of the wheels 116 are in substantial alignment with the vertical centerlines of the dynamometer rolls. The vehicle may be locked in place so as to maintain that position. The centering rolls 120 may then be moved to a retracted position for testing.

The centering rolls 120 are supported on lift brackets 122 pivotally supported on pivot points 126 on bracket support 123. Movement of the centering rolls is mechanically synchronized by meshing, arcuate, toothed gear sections 125 at the proximal or pivot ends of the lift brackets, each defined by an arc circumscribed by a ray extending from the corresponding pivot point. The pivot points are disposed on opposite sides of and equidistant from the vertical centerline of the dynamometer rolls 110, 112 and the lift brackets 122 are identically dimensioned such that the two centering rolls 120 associated with one of the dynamometer rolls 110, 112 are disposed equidistant from pivot points 126 and the dynamometer roll vertical centerline. Accordingly, pivoting motion of lift brackets 122 causes the centering rolls 120 to be moved along paths of travel in which all points of the two paths are equidistant from the vertical centerline of the dynamometer roll.

The lift brackets 122 are actuated by means of an actuator 128 connected by mechanical linkage to at least one of the two lift brackets 122 associated with each of the dynamometer rolls 110, 112. The actuator 128 may be a standard pneumatically, hydraulically or electrically operated actuator. In this illustrative embodiment, two actuators are provided, one on each side of the test platform and each actuator is mechanically linked to one lift bracket 122 of each of the two dynamometer rolls 110, 112. The actuator 128 is linked to a torque shaft 129 by means of a actuator bracket 131. The torque shaft 129 is supported on a longitudinally extending support member 130 extending alongside the dynamometer rolls 110, 112 and the torque shaft 129 is linked to the lift brackets 122 by means of a torque bracket 132 and a lift link 133 pivotally attached to the lift bracket 122 and the torque bracket 132 such that rotation of the torque shaft 129 is translated into a pivoting of the lift brackets 122 about pivot points 126.

A pair of hinged doors 135 in each of the openings 106 cover a portion of the openings when the centering rolls 120 are in a retracted position below the deck 102. The covers are hingedly attached along one edge thereof and are moved upward by the lift brackets 122 when these brackets and the centering rolls 120 attached thereto are raised.

Figure 2:
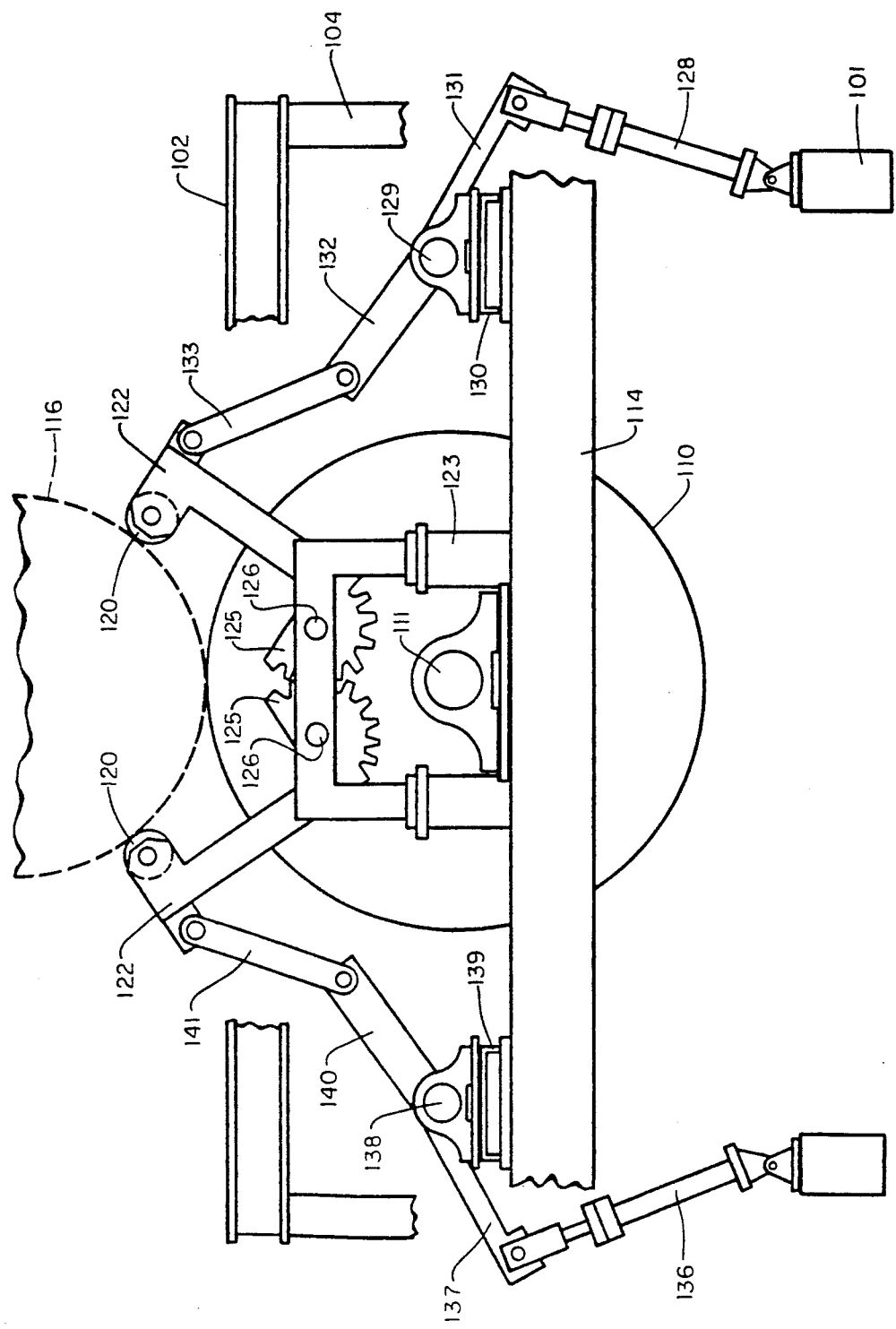
FIG. 2 is a diagrammatic end view of the wheel centering mechanism of FIG. 1.
Figure 3:
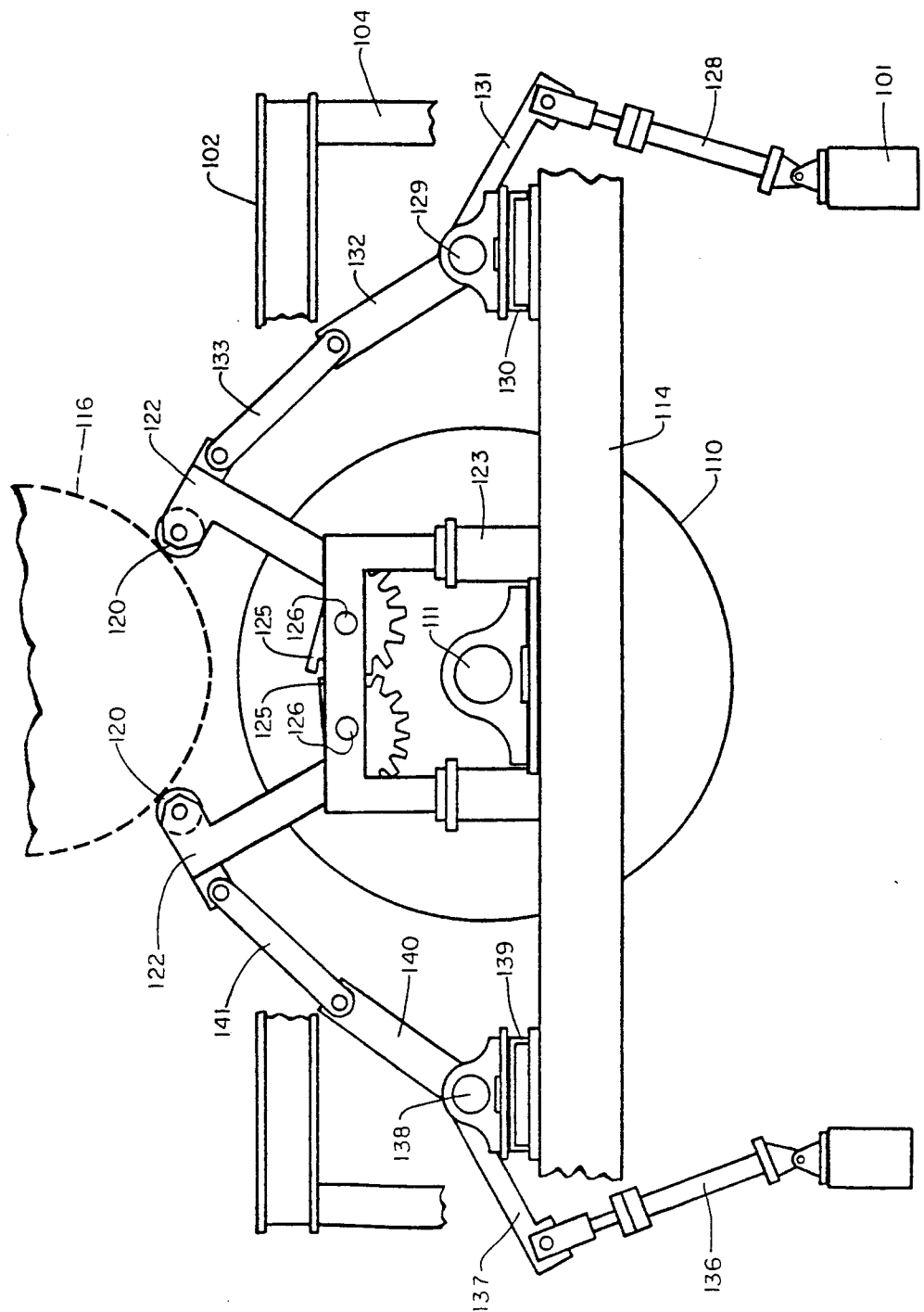
FIG. 3 is a diagrammatic end view of the wheel centering mechanism of FIG. 1 in an alternate position.

FIG. 2 is an enlarged diagrammatic fragmentary end view of the wheel centering device of test platform 100 showing the right-side lift bracket actuating mechanism shown in FIG. 1 and a corresponding left-side centering roll actuating mechanism, not shown in FIG. 1. It will be appreciated that because of the synchronizing action of the toothed gear sections 125, in meshing engagement, both the left and right lift brackets 122, shown in FIG. 2, can be operated with only one actuator, e.g., actuator 128. One advantageous property of the centering mechanism of this invention is that it may be used to lift the vehicle wheel 116 such that the wheel is not in contact with the dynamometer roll 110. This property may be used, for example, to run the dynamometer separate from the vehicle for a warmup period prior to the beginning of a test of the vehicle. The left-side actuating mechanism comprises a lift link 141 connected to the left-side lift bracket 122 and to a torque bracket 140 attached to a torque shaft 138. Shaft 138 is mounted on a longitudinally extending support member 139 and is actuated by an actuator 136 connected to shaft 138 via an actuator bracket 137. The left and right lift brackets 122 may be moved to a locking position wherein the torque bracket 140 and lift link 141 are in past-center alignment and torque bracket 132 and lift link 133 are in similar alignment while the actuators 128, 136 are in a fully retracted position. Such a locking configuration of the linkages and actuators is shown in FIG. 3. A particular advantage of this configuration is that the actuator mechanism will remain in the locking position even in the event of loss of power to the actuators 128, 136. To assure that the actuating mechanism can be unlocked, both actuators 128 and 136 are needed.

Figure 4:
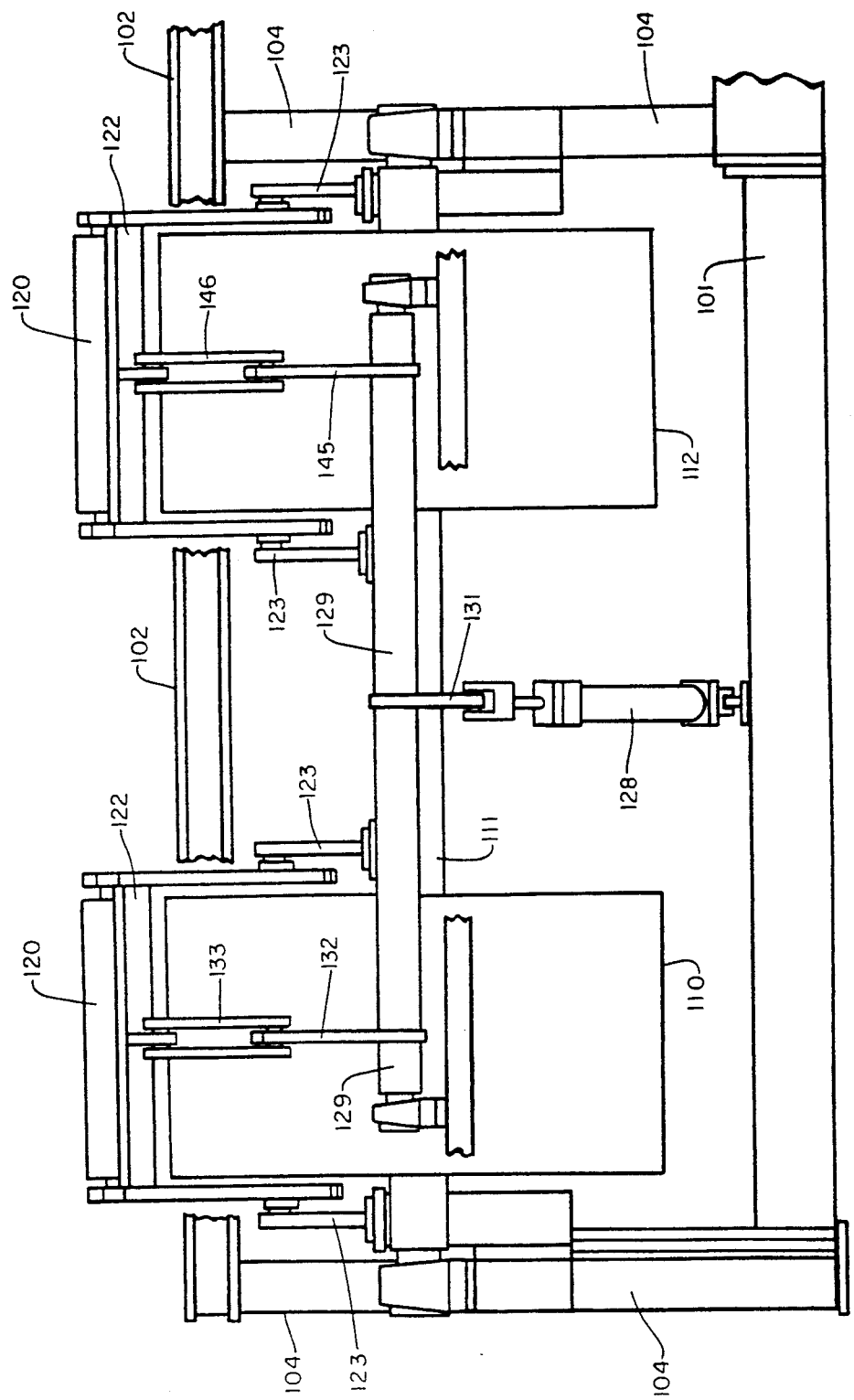
FIG. 4 is a diagrammatic front view of the wheel centering device of FIG. 1.

FIG. 4 is an enlarged fragmentary front view of the dynamometer rolls 110, 112 together with the lift rollers 120 and the actuating mechanism. As is readily apparent from FIG. 4, each of the lift rollers 120 is supported on a lift bracket 122 pivotally supported on a pair of pivot supports 123. As shown in FIG. 4, the centering rolls 120 associated with dynamometer roll 112 are actuated by the same actuator 128 which actuates the centering rolls 120 associated with dynamometer roll 110. A torque bracket 145 attached to the torque shaft 129 is mechanically connected via a lift link 146 to a lift bracket 122 associated with dynamometer roll 112. Accordingly, rotation of torque shaft 129 is translated into pivoting action of lift brackets 122 associated with both dynamometer rolls. In this manner, apparatus of this invention allows two wheels of a vehicle to be centered simultaneously on the top center portion of the two dynamometer rolls to assure proper alignment of the wheels with respect to the dynamometer rolls.

Figure 5:
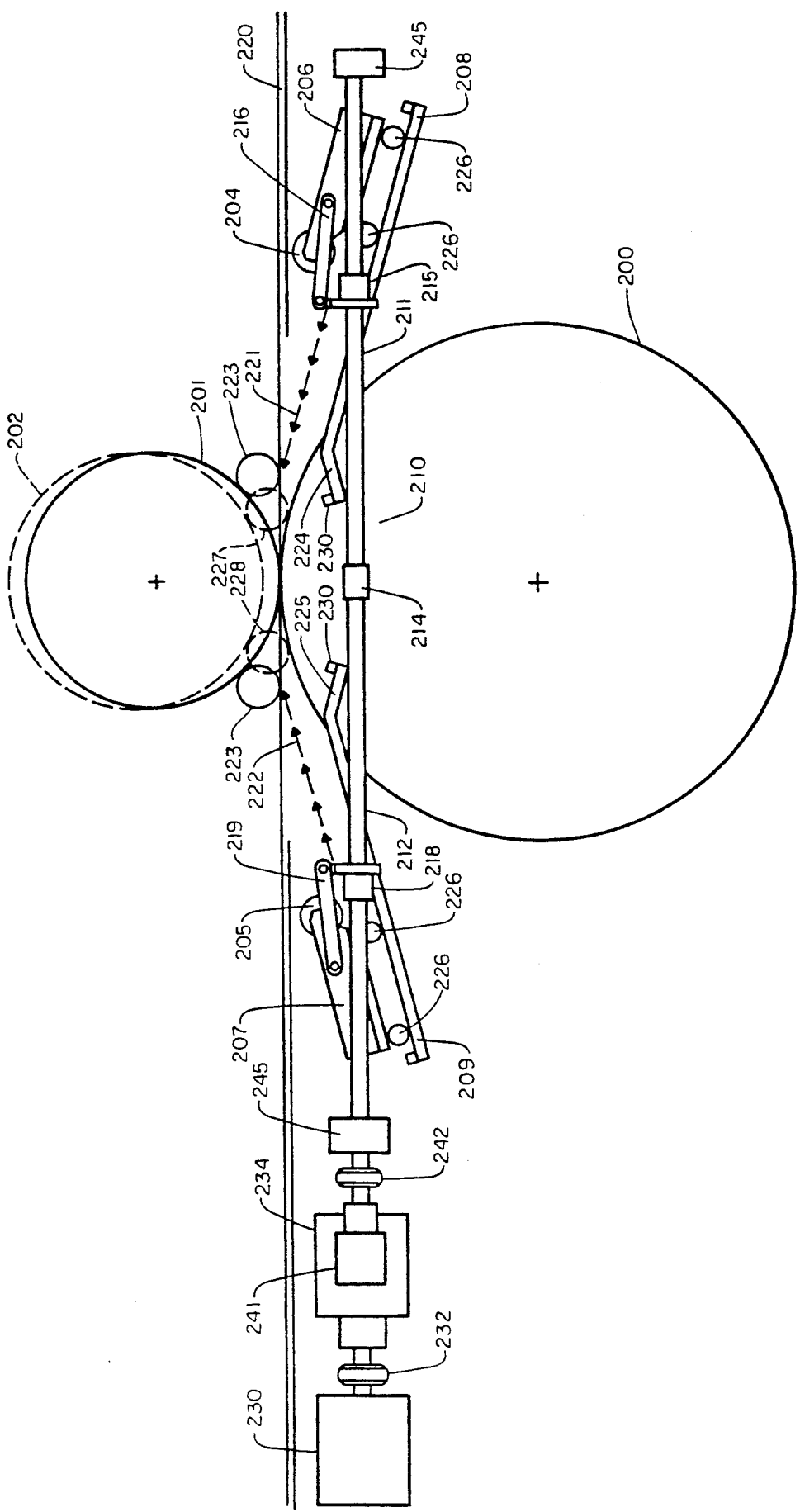
FIG. 5 is a diagrammatic end view of an alternate embodiment of a wheel centering device incorporating principles of the invention.
Figure 6:
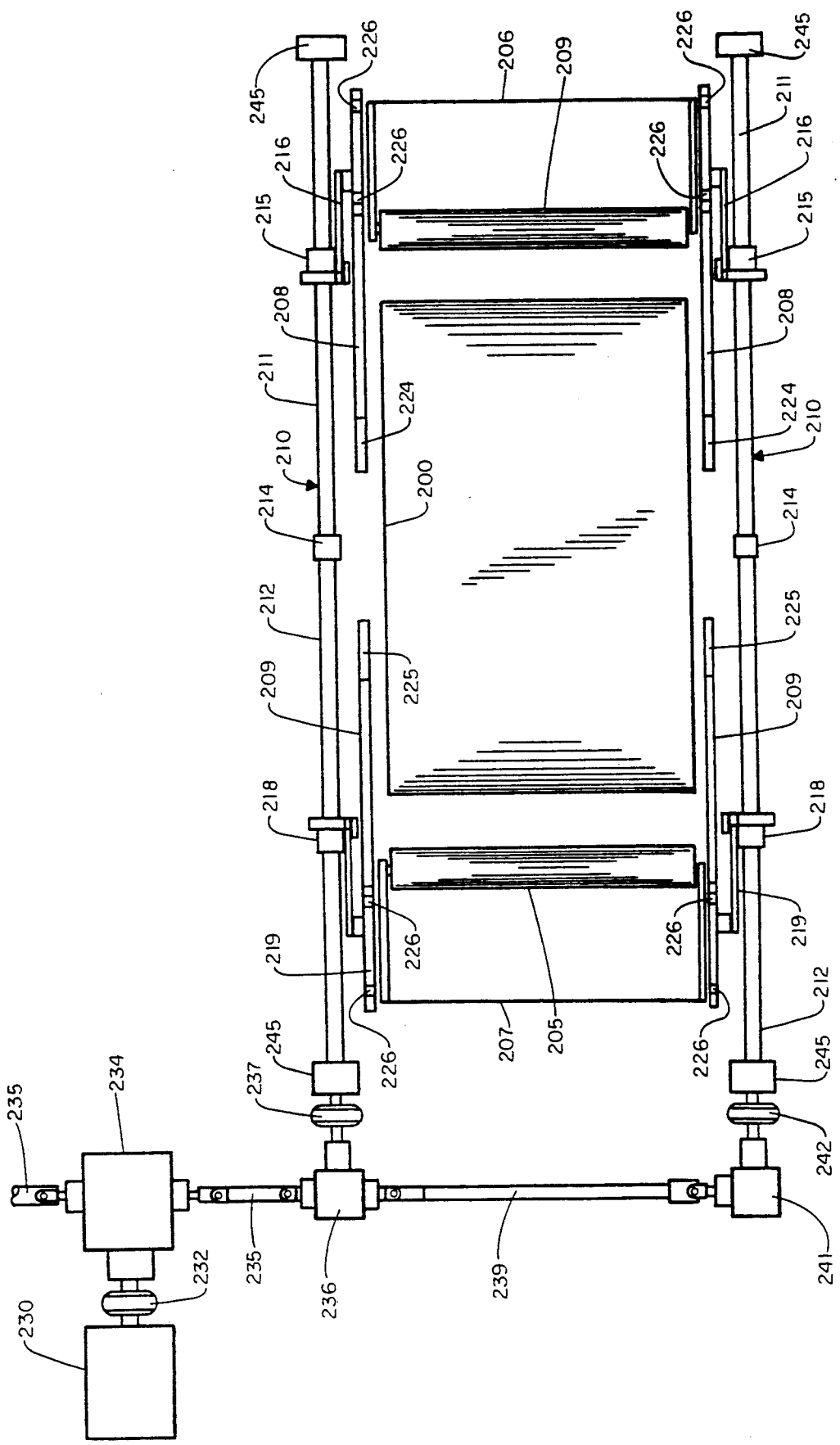
FIG. 6 is a diagrammatic partial plan view of the arrangement of FIG. 5.

FIG. 5 is a diagrammatic end view representation of an alternate embodiment of the invention showing an arrangement for centering the wheel of a vehicle on a dynamometer roll on a test platform such as the platform 100 in FIG. 1. FIG. 6 is a diagrammatic partial plan view representation of the arrangement of FIG. 5 showing the structure with respect to a single dynamometer roll. The dynamometer roll is represented at 200 in FIG. 5 and FIG. 6, and the vehicle wheel 201 is shown resting in a centered position on the dynamometer roll 200. The centering mechanism of FIG. 5 includes a pair of centering rolls 204, 205 supported on a corresponding pair of movable carriages 206, 207 which are adapted to travel along carriage tracks 208, 209, respectively. The two carriage tracks are disposed on opposite sides of the vertical centerline of the dynamometer roll 200 and include a travel surface for the carriages 206, 207 extending at an upwardly directed slope in the direction of the dynamometer roll 200. A carriage control shaft 210 includes a right-hand ball screw 211 and a left-hand ball screw 212 which are rigidly interconnected by means of a coupling 214. The carriage 206 is mechanically connected by means of a trailing arm 216 engaging the ball screw 211 to a right-hand ball nut 215. The right-hand ball screw 211 and a right-hand ball nut 215 are provided with matching helical screw threads such that rotation of the ball screw 211 results in linear movement of the ball nut along the ball screw 211. In a similar fashion, the carriage 207 is connected by means of a trailing arm 219 engaging ball screw 212 to a left-hand ball nut 218. The left-hand ball nut 218 and the left-hand ball screw 212 are provided with matching helical threads such that rotation of the ball screw 212 results in linear movement of the ball nut 218 along the ball screw 212. The ball screws 211, 212 and their associated ball nuts 215, 218 are dimensioned such that the linear travel of one of the ball nuts is substantially identical to that of the other for a predetermined amount of rotation of the control shaft 210. Furthermore, the carriages 206, 207 and the trailing arms 216, 219 are dimensioned such that the centering rolls 204, 205 are maintained at a substantially identical distance from their respective ball nuts 215, 218. Since the coupling 214 rigidly interconnects the two ball screws 211, 212, these ball screws are always rotated by the same amount. In this manner, the centering rolls 204, 205 are at all times equidistant from the vertical centerline of the dynamometer roll 200.

The carriage tracks 208, 209 are sloped so that the carriages may be withdrawn below the top surface of the test platform represented at 220. As the ball nuts 215, 218 are drawn toward the vertical centerline of the dynamometer roll 200, the centering rolls 204, 205 will approach the wheel 201 from positions equidistant from the vertical centerline and will force the wheel 201 toward a position in which the vertical centerline of the wheel will coincide with the vertical centerline of the dynamometer roll 200. The position of the lower edge of the centering rolls 204, 205 is represented in the drawing by arrows at 221, 222, respectively, to indicate the path of travel. The positions of rolls 204, 205, when in the position for centering the wheel 201 on the dynamometer roll 200, are shown in phantom at 223. The carriages 206, 207 are positioned on an upwardly sloping portion of the carriage tracks 208, 209, respectively, as they are moved toward the wheel centering position. A further rotation of the ball screws 211, 212 may force the centering rolls 204, 205 to a position closer to the vertical centerline of the dynamometer roll 200 and of the wheel 201. Such further movement will result in a lifting of the wheel 201 to a position indicated in phantom at 202. The corresponding position of the centering rolls 204, 205 in the wheel lifting position is indicated in phantom at 227, 228. The carriage tracks 208, 209 are each provided with a slightly downwardly inclining end section at 224, 225. When the centering rolls 204 and 205 are in the wheel lifting position as shown at 227, 228, respectively, one wheel 226 of each of the two carriages 206, 207 is positioned on the downwardly inclining end sections of the tracks. The end sections are each provided with a stop such that the carriage is prevented from moving beyond the end of the track. In this position, the carriages 206, 207 are prevented from moving along the upwardly sloping portion of the tracks 208, 209 absent a force in that direction applied by the carriage control shaft 210. This allows the vehicle wheel 201 to be locked in the raised position in which it will remain even in the absence of holding force on the carriage control shaft 210.

The diagrammatic partial plan view of FIG. 6 shows two carriage tracks 208 associated with the right-hand carriage 206 and two carriage tracks 209 associated with the left-hand carriage 207. A carriage control shaft 210 is provided on each side of the carriages 206, 207. The control shafts 210 are driven from a common source, namely, motor 230. The motor 230, which may, for example, be an electric motor, is coupled by means of a shaft coupling 232 to a gear box 234. The motor 230 and gear box 234 are arranged to drive wheel centering apparatus for two spaced-apart dynamometer rolls, each for engaging a vehicle wheel as represented, for example, in FIG. 1. Drive shafts 235 extend in opposite directions of the gear box 234 to accomplish this function. One of the drive shafts 235 is shown connected to a ball screw gear box 236 which drives one of the carriage control shafts 210 through shaft coupling 237 and drives the other control shaft 210 via drive shaft 239, a gear box 241 and coupling 242. The two carriage control shafts 210 are each supported at their extremities on bearings 245.

Figure 7:
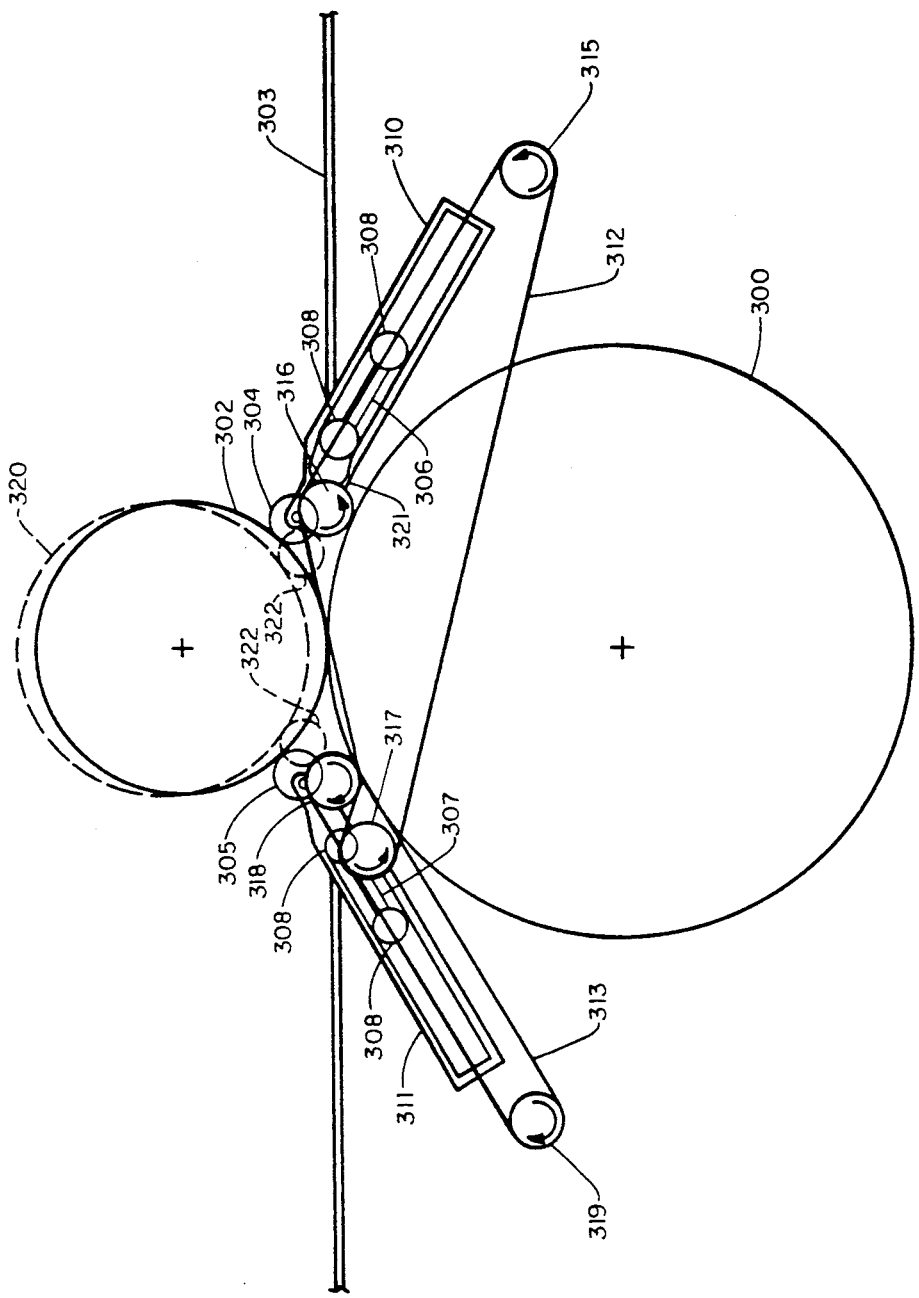
FIG. 7 is a diagrammatic end view of a second alternate embodiment of a wheel centering device incorporating principles of the invention.
Figure 8:
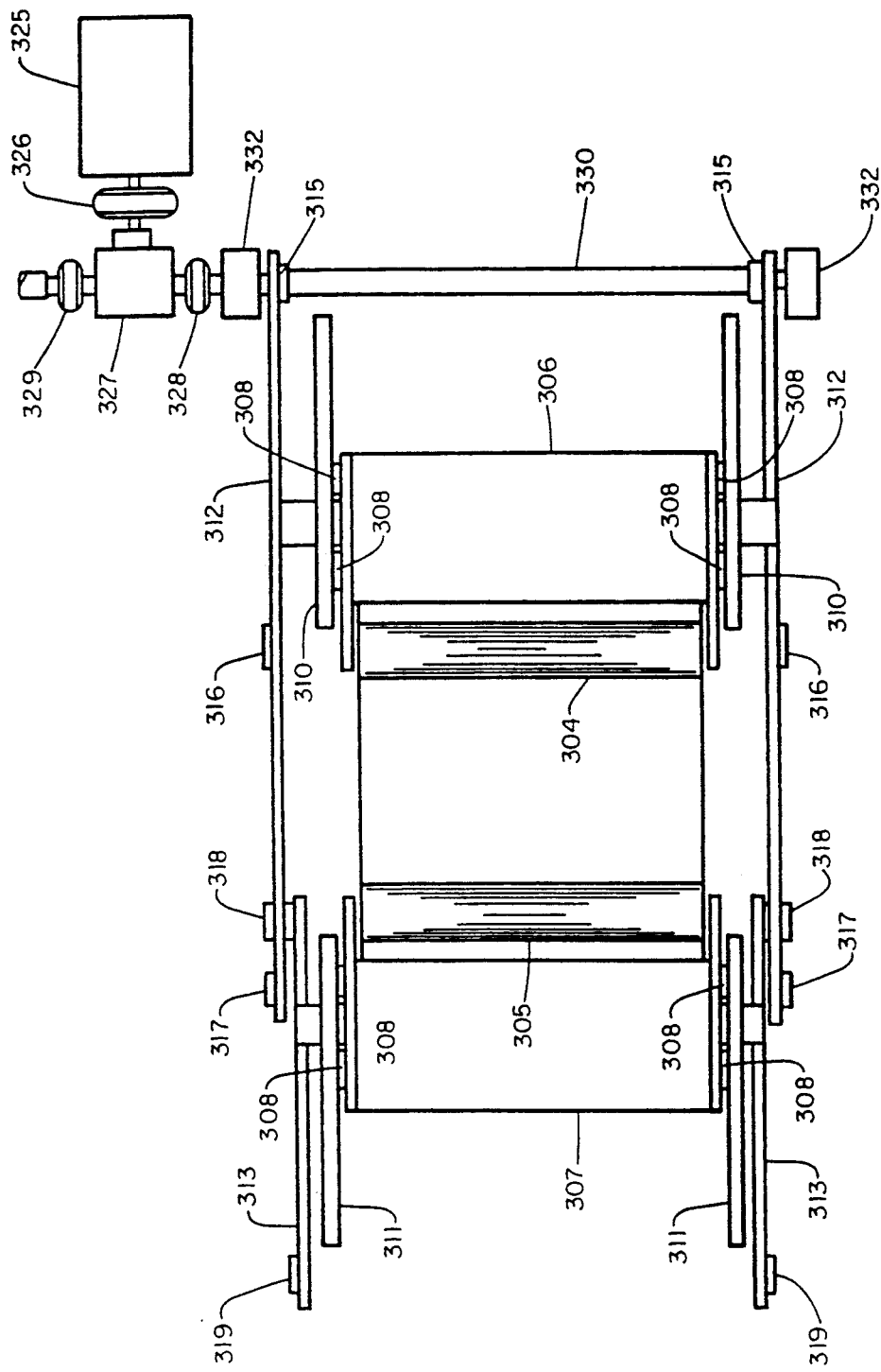
FIG. 8 is a diagrammatic partial plan view of the device of FIG. 7.

FIG. 7 is a diagrammatic end view representation of another alternate embodiment of the invention showing a tire centering device such as may be employed in a test platform shown generally at 100 in FIG. 1. FIG. 8 is a diagrammatic partial plan view representation of the apparatus shown in FIG. 7. FIG. 7 shows a dynamometer roll 300 which engages a vehicle wheel 302 at the top center portion of the dynamometer roll. A pair of centering rolls 304, 305 are supported on carriages 306, 307, each of which includes a pair of support wheels or rollers 308. The carriages 306, 307 travel within fixed carriage tracks 310, 311 in upwardly inclining planes extending toward the top center of dynamometer roll 300. The carriage 306 is mechanically connected to a right-hand drive chain 312, and carriage 307 is mechanically connected to a left-hand drive chain 313. The right-hand drive chain 312 engages a toothed drive sprocket 315, idler sprockets 316 and 317, and one track of a two-chain sprocket 318. The left-hand drive chain 313 engages another track of the two-chain sprocket 318 And an idler sprocket 319. Arrows on sprockets 316 through 319, shown in FIG. 7, indicate the direction of rotation for each of the sprockets when the drive sprocket 315 is rotated in the direction indicated by the arrow thereon.

The chains 312 and 313 may, for example, be roller chains in nonslip engagement with teeth of the drive sprocket 315 and the two-chain sprocket 318 to assure a predefined movement of the two carriages 306, 307 along the tracks 310, 311 for a specified rotational displacement of the drive sprocket. In this particular embodiment, the drive sprocket and the idler sprocket all are of like dimensions and the linear movement of carriage 307 on track 308 will be identical to the linear movement of carriage 306 and track 310. By initially adjusting the carriages such that the centering rolls 304, 305 are positioned equidistant from the vertical centerline of the dynamometer roll 300, it is assured that the centering rolls 304, 305 remain at all times equidistant from that vertical centerline as the drive sprocket 315 is rotated. The carriages 306, 307 may originally be positioned such that the centering rolls 304, 305 are withdrawn below the top surface 303 of the dynamometer test platform. The two centering rolls may then be driven toward the wheel 302 by operation of the drive sprocket 315, forcing the wheel toward a position in which it is in engagement with the top center portion of the dynamometer roll 300 and the vertical centerline of the wheel is in substantial alignment with the vertical centerline of the dynamometer roll. The carriages 306, 307 may be moved beyond the wheel centering position to a lifting position in which the wheel is supported away from the dynamometer roll. The lifted position of the wheel is shown in phantom at 320. The positions of the centering rolls 304, 305, in the lifting position, are shown in phantom at 322. The right-hand carriage track 310 is provided with an indented position in which one-of the wheels or rollers 308 is positioned when the centering rolls 304, 305 are in the wheel lifting position. The indent 321 serves to maintain the carriage in a locking lift position in which it will remain absent a driving force from the drive sprocket 315 away from that position.

The diagrammatic partial plan view representation of FIG. 8 shows carriage tracks 310 and 311 and drive chains 312, 313 at both ends of the carriages 306, 307 which support centering rollers 304, 305, respectively. FIG. 8 shows one of two wheel centering arrangements used in a motor vehicle test platform, both driven from a single power source 325 which may, for example, be an electric motor. The motor is connected by means of a shaft coupling 326 to a gear box 327 by which power is applied through couplings 328 and 329 to the two separate wheel centering arrangements. Coupling 328 is connected to a drive shaft 330, supported on bearings 332 and engaging drive sprockets 315. By operation of the motor, the drive sprockets may be driven in either direction causing movement of the centering rolls 304 and 305 as described with respect to FIG. 7.

It is to be understood that the above-described arrangements are merely illustrative of the application of the principles of the invention and that numerous other arrangements may be devised by those skilled in the art without departing from the spirit and scope of the invention.

What is claimed is:

1. A wheel centering device in a motor vehicle test platform having a cylindrically-shaped dynamometer roll disposed for engagement with a drive wheel of a vehicle to be tested, said centering device comprising:
    a pair of movable centering rolls for centering said drive wheel on said dynamometer roll and disposed adjacent said dynamometer roll on opposite sides of the vertical centerline thereof;
    a pair of fixed and horizontally aligned spaced-apart pivot supports disposed equidistant from said vertical centerline;
    a pair of lift brackets each rotatably supporting one of said centering rolls and each having a proximal end pivotally engaging one of said pivot supports;
    a toothed gear section on said proximal end of each of said lift brackets disposed in meshing engagement for mechanically synchronizing rotation of said lift brackets on said pivot supports; and
    an actuator connected to at least one of said lift brackets for moving said lift brackets and said centering rolls between selected positions adjacent said dynamometer roll while maintaining an equal distance between said vertical centerline and each of said centering rolls.

2. The wheel centering device in accordance with claim 1 wherein said actuator comprises a linearly extending actuator and wherein said device further comprises a link pivot support and a first link pivotally connected to said at least one lift bracket and a second link pivotally supported on said link pivot support and pivotally connected to said linearly extending actuator and said first link, whereby linear movement of said actuator is translated into movement of said lift brackets and said centering rolls relative to said centerline of said dynamometer roll.

3. The centering device in accordance with claim 2 and further comprising a second linearly extending actuator and a second link pivot support and third link pivotally connected to another of said pair of lift brackets and a fourth link pivotally supported on said second link pivot support and pivotally connected to said second actuator and said third link.

4. The wheel centering device in accordance with claim 3 wherein said first and second links and said third and fourth links are adapted to be aligned in a past-center alignment position to lift said wheel to a position above and removed from said dynamometer roll in a mechanically locked relationship, thereby allowing free rotation of said dynamometer roll.

5. The wheel centering device in accordance with claim 1 wherein said centering rolls are operative to position said wheel relative to said dynamometer roll such that the vertical centerline of said wheel is in substantially linear alignment with said centerline of said dynamometer roll.

6. The device in accordance with claim 1 wherein each of said toothed gear sections comprises an arcuate section defined by an arc circumscribed by a ray extending from a corresponding one of said pivot supports.

7. A wheel centering device in a motor vehicle test platform having first and second cylindrically-shaped dynamometer rolls disposed in linear alignment for engagement with a pair of drive wheels of a vehicle to be tested, said centering device comprising:

a first pair of movable centering rolls for centering one of said drive wheels on said first dynamometer roll and disposed adjacent said first dynamometer roll on opposite sides of the vertical centerline of said linearly aligned dynamometer rolls and disposed equidistant from said vertical centerline;

a second pair of movable centering rolls for centering a drive wheel on said second dynamometer roll and disposed adjacent said second dynamometer roll on opposite sides of said vertical centerline and disposed equidistant from said vertical centerline;

first and second pairs of fixed and horizontally aligned spaced-apart pivot supports, said pivot supports of each pair of pivot supports disposed equidistant from said vertical centerline;

first and second pairs of lift brackets, each bracket rotatably supporting one of said centering rolls and each bracket having a proximal end pivotally supported on one of said pivot supports, each of said brackets having a toothed gear section on said proximal end thereof, said toothed gear sections on said lift brackets of each of said pair of lift brackets disposed in meshing engagement;

a pivotally mounted torque shaft disposed adjacent at least one lift bracket of each of said pairs of lift brackets and link apparatus interconnecting said torque shaft and said at least one bracket of each of said pairs of brackets; and an actuator for rotationally actuating said torque shaft for moving said lift brackets and said centering roll relative to said vertical centerline.

8. A wheel centering device in a motor vehicle test platform having a cylindrically-shaped dynamometer roll disposed for engagement with a drive wheel of a vehicle to be tested, said centering device comprising:

a pair of movable centering rolls for centering said drive wheel on said dynamometer roll and disposed adjacent said dynamometer roll on opposite sides of the vertical centerline thereof;

a pair of centering roll supports disposed on opposite sides of said centerline for movably supporting said centering rolls;

a synchronizing apparatus connected to said centering roll supports for moving said centering rolls along paths of travel in which corresponding points are equidistant from said vertical centerline; and actuator means for actuating said supports to move said centering rolls along said paths of travel;

whereby said centering rolls are disposed equidistant from said centerline and operative to position said drive wheel in engagement with said dynamometer roll at the top center position of said dynamometer roll.

9. The device in accordance with claim 8 wherein said centering roll supports each comprise a pivot end and a toothed gear section at said pivot end and said arrangement further comprises a pair of horizontally aligned stationary pivot supports disposed equidistant of said centerline, said toothed gear sections being disposed adjacent one another and in meshing engagement thereby mechanically synchronizing movement of said centering roll supports along said paths of travel, whereby said centering rolls are at all times disposed equidistant from said vertical centerline.

10. The device in accordance with claim 8 wherein each of said centering roll supports comprises a carriage track and a carriage on each of said tracks for movably supporting said centering rolls equidistant from said vertical centerline.

11. The device in accordance with claim 10 wherein said synchronizing apparatus comprises a horizontally-disposed carriage control shaft extending on opposite sides of said vertical centerline and disposed adjacent said carriage tracks;

said carriage control shaft comprising a pair of oppositely threaded screw sections disposed on opposite sides of said vertical centerline and a pair of threaded nuts, each engaging one of said threaded sections;

said carriages each comprising a connecting link for connection to one of said threaded nuts, said threaded nuts and said carriages positioned relative to said vertical centerline such that said centering rolls are disposed equidistant from said vertical centerline;

whereby rotation of said shaft causes said centering rolls to be moved relative to said vertical centerline while maintaining an equal distance between each of said centering rolls and said vertical centerline for positioning said drive wheel for engagement with a top center portion of said dynamometer roll.

12. The device in accordance with claim 11 wherein said tracks are disposed in inclined planes extending upwardly toward said centerline.

13. The device in accordance with claim 12 wherein said carriages each comprises support rollers for movably supporting said carriages on said tracks and wherein at least one of said tracks comprises an end section adjacent said vertical centerline extending out of said inclined plane and sloping toward said centerline and wherein said centering rolls are positioned to support said wheel away from said dynamometer roll when one of said support rollers of one of said carriages is disposed on one of said end sections of said at least one of said tracks, whereby said wheel may be supported on said centering rolls in a locked position.

14. The centering device in accordance with claim 10 wherein said synchronizing apparatus comprises a first driven chain connected to one of said carriages and to a two-chain sprocket and a second chain connected to another of said carriages and said two-chain sprocket, whereby movement of said first chain causes both of said carriages to be moved relative to said vertical centerline while being maintained equidistant from said vertical centerline.

15. The device in accordance with claim 14 wherein said tracks are disposed in inclined planes extending upwardly toward said centerline.

16. The device in accordance with claim 15 wherein said carriages each comprises support rollers for movably supporting said carriages on said tracks and at least one of said tracks comprises a recessed area adjacent said vertical centerline and wherein said centering rolls are positioned to support said wheel away from said dynamometer roll when one of said support rollers is disposed in said recess.

17. In combination, a motor vehicle test platform comprising a vehicle support deck to support a vehicle to be tested and a cylindrically-shaped dynamometer rolls disposed for engagement with a drive wheel of a vehicle to be tested, said dynamometer roll supported on a horizontally disposed axial support shaft and having a vertical center line and an outer circumferential surface, the combination further comprising a pair of movable centering rolls disposed adjacent said outer circumferential surface and on opposite sides of said vertical centerline and having a centered position wherein said centering rolls are disposed adjacent a top center portion of said dynamometer roll and equidistant from said center line and a retracted position, and actuator apparatus connected to said centering rolls and operative to selectively move said centering rolls between said retracted position and said centered position, whereby said drive wheel of a vehicle to be tested is placed in substantial alignment with said vertical center line for engagement with said top center portion of said dynamometer roll.

18. The combination in accordance with claim 17 wherein said actuator apparatus comprises a pair of linearly extending actuators.

* * * * *